May 19, 1942.                  C. L. CONNERS                    2,283,425
                               WEIGHING SCALE
                            Filed April 1, 1938              3 Sheets-Sheet 1

INVENTOR.
CARL L. CONNERS
BY
*Swan, Frye Hardesty*
ATTORNEYS

May 19, 1942.                C. L. CONNERS                 2,283,425
                              WEIGHING SCALE
                        Filed April 1, 1938           3 Sheets-Sheet 2
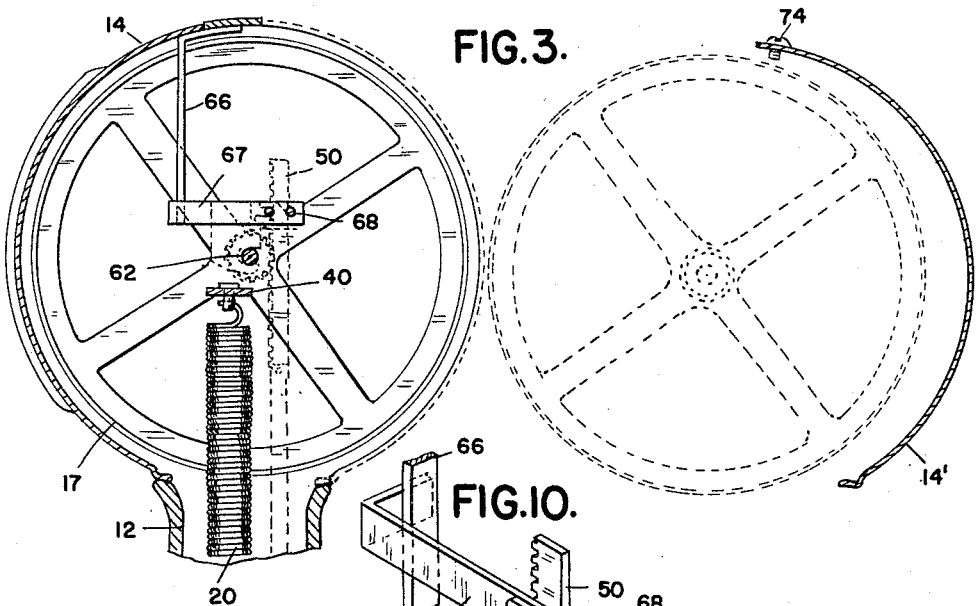
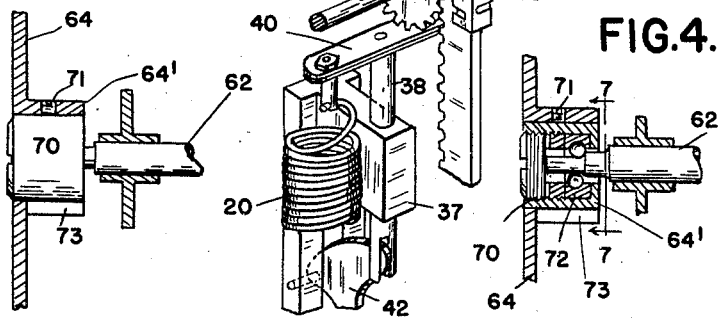
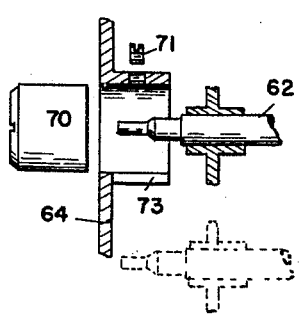
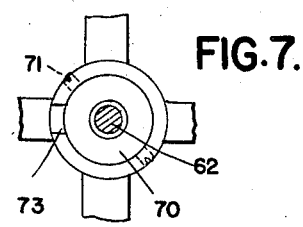
INVENTOR.
CARL L. CONNERS
BY
ATTORNEYS May 19, 1942.  C. L. CONNERS  2,283,425
WEIGHING SCALE
Filed April 1, 1938  3 Sheets-Sheet 3

INVENTOR
CARL L. CONNERS
BY
ATTORNEYS

Patented May 19, 1942

2,283,425

UNITED STATES PATENT OFFICE 2,283,425

WEIGHING SCALE

Carl L. Conners, Louisville, Ky., assignor to Walter F. Stimpson, Louisville, Ky.

Application April 1, 1938, Serial No. 199,488

1 Claim. (Cl. 265—38)

This invention relates to weighing scales of the cylindrical computing chart type, and aims to provide an improved and simplified structure so arranged that the load-receiving means, the load counterbalancing means, the lever system, and in fact all parts of the mechanism except the indicator chart, are supported directly upon the base member and unattached to other frame portions of the scale, the chart being carried in elevated position by a column upstanding from the base. An important object of the invention is the provision of a scale of the character indicated so arranged that the column, which constitutes a part of the frame of the scale, may readily be removed, and columns of different heights substituted, without disturbing the major elements of the scale mechanism. A related object is the provision of an improved means for supporting the load counterbalancing means of such a scale.

Another object is the provision of improved means for removably supporting the indicator chart, in a scale of the class described, in a manner which permits ready interchanging of charts, with or without removal of the column, and substitution of different charts in the same scale without disassembling the scale mechanism.

Other objects and advantages will be apparent from the following description, wherein reference is made to the accompanying drawings illustrating a preferred embodiment of the invention and wherein similar reference numerals designate similar parts throughout the several views.

In the drawings:

Figure 3 is a vertical section elevational of somewhat diagrammatic character, taken substantially on the line 3—3 of Figure 1 and looking in the direction of the arrows, with one cover plate removed from the chart housing, also indicating in dotted lines the manner of removal of the chart.

Figure 4 is a detailed sectional view of one of the chart bearings, taken substantially on the line 4—4 of Figure 1 and looking in the direction of the arrows.

Figure 5 is a similar sectional view showing the bearing assembly in elevation.

Figure 6 is a view similar to Figure 5 with the bearing removed, and showing the manner of removal of the chart and its supporting shaft.

Figure 7 is a detailed section taken substantially on the line 7—7 of Figure 4 and looking in the direction of the arrows.

Figure 10 is a perspective view of the rack and pinion driving means for the chart, and the guiding means for such elements, viewed from the opposite side to that shown in Figure 8.

Figure 1:
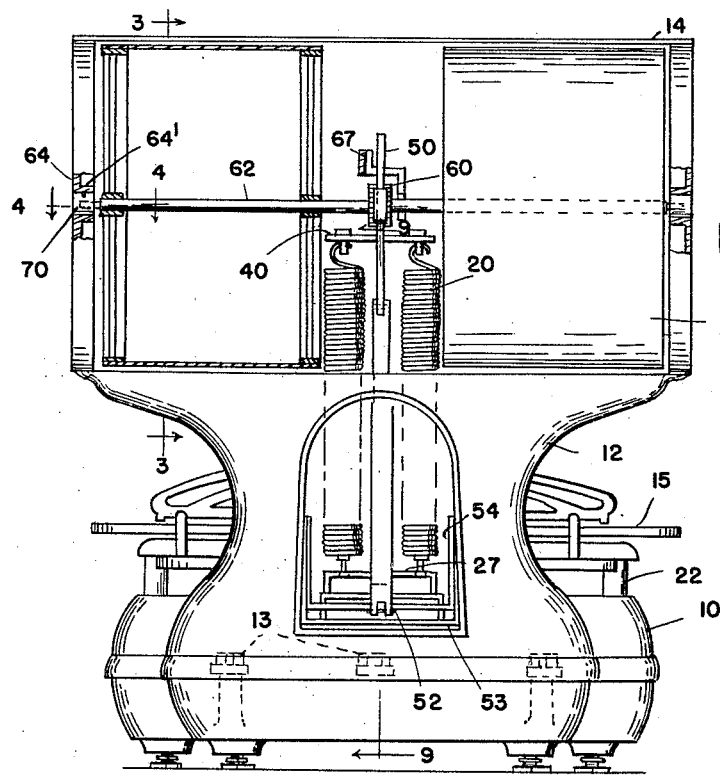
Figure 1 is a rear elevational view of a weighing scale incorporating the principles of this invention, the chart housing being partly broken away and the inspection door removed.

Referring now to the drawings, reference character 10 designates the hollow base portion of the scale, such base portion carrying at its rear end an upstanding column 12 which is also hollow and communicates interiorly with the base. The column is removably attached to the base by screws 13. At its top the column supports the chart housing 14. These parts will be seen to be arranged in a more or less conventional manner. The load receiving platform 15, chart 17 and counterbalancing springs 20 are also disposed in a manner more or less usual, the platform being carried above the relatively flat base by posts 22 supported directly upon the lever system. Only the main lever, designated 25, is shown. The load counterbalancing means comprises springs 20 arranged vertically within the column and connected to the nose iron by means of a stirrup 27 which encircles and extends beneath the nose iron, supporting from beneath an agate V-block 30 in which rests a knife edged pivot 31 carried on the underside of the nose iron.

The loading of the scale is thus directly transmitted to the springs, which are suspended from above, their upper ends being attached to adjustable and thermostatically compensated holding means carried at the top of support 35, of inverted U-shape, secured to and upstanding from the base. The bottom of each leg of the support is screwed or otherwise rigidly fastened to a block-like projection integrally cast upon the interior of the base, one appropriately located upon either side of the nose iron and stirrup assembly. At its top the support carries a rearwardly projecting overhanging section 37, vertically apertured to slidably support a rod 38. The top of the rod projects above the support portion 37, carrying a transversely disposed flat bi-metallic strip, whose laterally projecting arms directly carry the springs 20. A cam 42 adjustably supports the bottom of the rod 38, fitting in a slot therein. The cam is movably held by an adjusting screw 45, turning which raises or lowers the spring supporting post 38 and thermostat 40. The thermostat is arranged to compensate for changes of spring length due to temperature variations.

The rack rod 50 is connected to and actuable by the nose iron 26, additional thermostatic compensating means being provided to change the effective point of such connection. The lower end of the rack rod will be seen to be articulated by a pin 52 to a U-shaped yoke 53 which in turn is swingable with respect to the nose iron and main lever about a transverse horizontal axis. Yoke 53 is carried by a U-shaped supporting yoke 54 attached to and extending upwardly and rearwardly from the nose iron. A coil-type thermostat 55, secured by bracket 56 to the rack rod, actuates through a link 57 a lever 58 pivoted on the rack rod. If desired, the lower portion of the rack rod may be of channeled section, and lever 58 pivoted therewithin, on a pin as 59 extending through the sides of the channel. The lower end of lever 58 is articulated to the nose iron by a link 61, as a result of which it will be seen that actuation of the lever by thermostat 55 moves the lower end of the rack rod bodily toward and from the nose iron, swinging the supporting yoke 53 accordingly.

At its upper end the rack rod meshes with a pinion 60 to actuate the chart shaft 62 and the chart 17 carried thereby. The guiding means for the rack rod is so arranged that removal thereof to allow disconnecting the rack rod from the pinion may easily be effected. The guiding means for the rack rod comprises a looped sheet metal element 65 loosely embracing the back of the rack section and acting to prevent separation of the rack from the pinion, while maintaining them in proper loosely meshing relation. A bracket 66 supported from the interior of the chart housing near its top projects downwardly therewithin, and carries a forwardly projecting arm 67 to which the rack guiding element 65 is removably attached, as by screws 68. Another guide 69, also carried by the arm 67 provides a supplemental bearing for the shaft 62 and prevents flexure of the shaft and unwanted movement of pinion away from the rack. The portion 69 which engages the shaft will be seen to comprise a slot open at its rear end to allow removal of the shaft and the chart from the chart housing, after the rack and its guide portion 65 have first been moved out of obstructing position.

Figure 2:
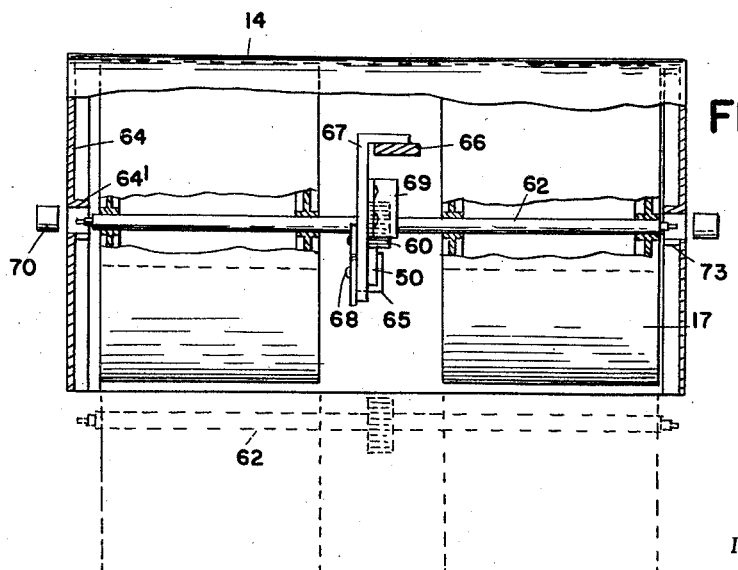
Figure 2 is a top plan view of the chart housing portion of the scale, also partly broken away, with bearing parts moved outward to free the chart, indicating in dotted lines the manner of removal of the chart.
Figure 8:
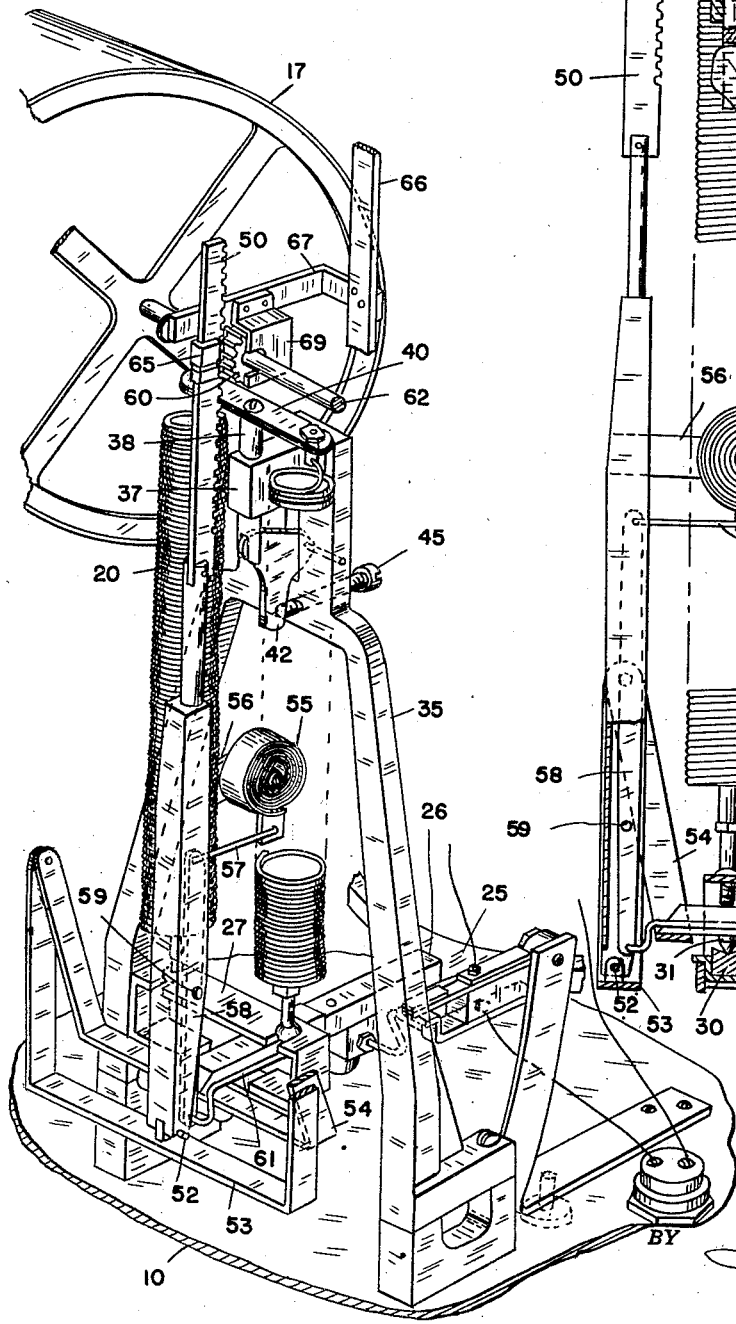
Figure 8 is a perspective view of the scale mechanism which is housed within the column portion, parts being broken away.
Figure 9:
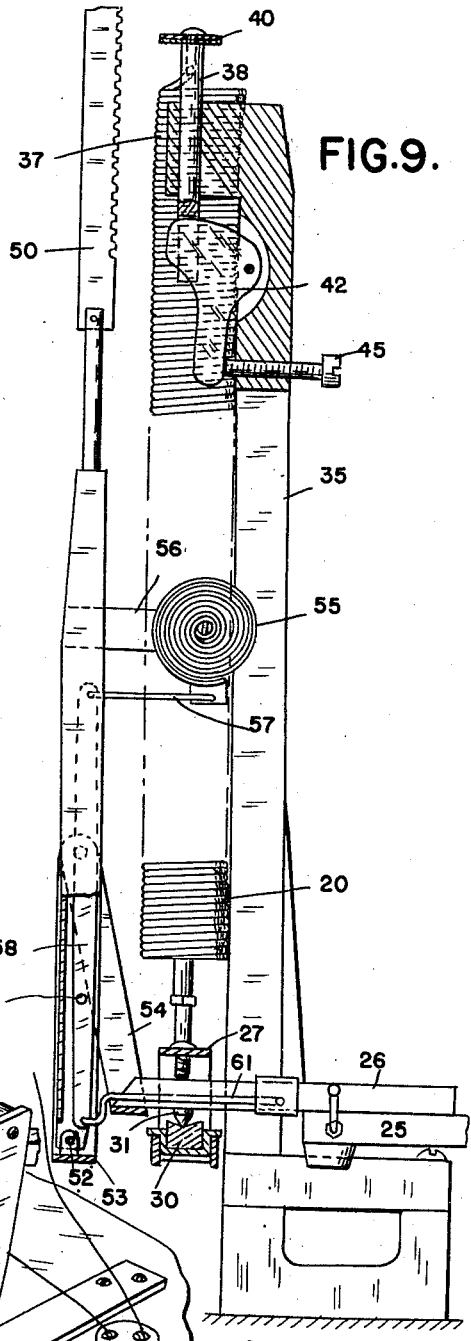
Figure 9 is a vertical sectional view taken substantially on the line 9—9 of Figure 1, and looking in the direction of the arrows, parts also being broken away.

The chart shaft 62 is rotatably supported at its ends in the end webs 64 of the chart housing. Each bearing assembly 70 for the shaft is removably held in its central mounting in the web by a set screw 71, the bearing assembly being slidable endwise out of its mounting, as shown in Figures 2 and 6. The sleeve-like bearing holding portions 64' project inwardly from the webs 64, and are slotted or left open at 73 at the rear, to allow removal of the shaft through such openings after removal of the bearing assemblies. The construction of the bearings is best shown in Figure 4, comprising a ball bearing assembly 72 removably mounted in a casing, generally designated 70. The rearwardly facing opening in the bearing support 64' is designated 73. The rear cover section 14' of the chart housing is also removably held in place, as by screw 74.

It will readily be perceived that upon removal of the rack rod guide 65, and movement of the rack rod out of the interfering position, the chart may be removed from the chart housing, simply by removing the cover plate 14' and moving the bearing assemblies 70 outwardly to permit the ends of the shaft to move through the openings 73. Thus charts having different indicia may readily be substituted. It will also be apparent that by removal of the column 12 and substitution of rack rods of different lengths, columns of varying heights may be substituted without disturbing the major components of the scale.

What I claim is:

In a weighing scale of the cylinder-computing type, a housing comprising a hollow base and a hollow column connected to and upstanding from the base but separable therefrom, and a chart housing carried by the column, load counterbalancing means housed at least partly within said column, a lever system housed at least partly within said base, load receiving means supported above said base and carried at least partly by said lever system, a rotatable cylinder-type weight indicating chart within said chart housing, formed in a plurality of axially spaced sections having a gap therebetween, said gap being aligned with the hollow column, actuating means extending through said column and connecting the lever system to said chart, supporting means for said counterbalancing means carried entirely by the base and rigidly held thereby against movement in all directions and extending upwardly through and independently of said column into the gap in said chart to support said counterbalancing means from above and independently of the column, said counterbalancing means being connected to the lever system.

CARL L. CONNERS.